United States Patent

Sugimoto et al.

[11] Patent Number: 5,100,211
[45] Date of Patent: Mar. 31, 1992

[54] HYDRAULIC BRAKING PRESSURE CONTROL SYSTEM

[75] Inventors: Yoichi Sugimoto; Kougyoku Go; Yoshihiro Iwagawa; Etsuo Fujii, all of Saitama; Naotoshi Tamai; Atsushi Shimizu, both of Nagano, all of Japan

[73] Assignees: Honda Giken Kogyo Kabushiki Kaisha, Tokyo; Nissin Kogyo Kabushiki Kaisha, Nagano, both of Japan

[21] Appl. No.: 611,575

[22] Filed: Nov. 13, 1990

[30] Foreign Application Priority Data

Nov. 14, 1989 [JP] Japan .................. 1-132318[U]

[51] Int. Cl.⁵ .............................................. B60T 8/40
[52] U.S. Cl. .......................... 303/115 PP; 303/113 R; 303/9.63
[58] Field of Search ............... 303/115, 119, 113, 116, 303/9.63, 92

[56] References Cited

U.S. PATENT DOCUMENTS

| | | | |
|---|---|---|---|
| 4,017,126 | 4/1977 | Ohta | 303/115 |
| 4,322,114 | 3/1982 | Maehara | 303/9.63 |
| 4,890,891 | 1/1990 | Leiber | 303/92 X |
| 4,929,036 | 5/1990 | Iwagawa et al. | 303/115 |

FOREIGN PATENT DOCUMENTS 1421703 1/1976 United Kingdom .
2163821 3/1986 United Kingdom .

Primary Examiner—Matthew C. Graham
Assistant Examiner—Josie A. Ballato
Attorney, Agent, or Firm—Armstrong & Kubovcik

[57] ABSTRACT

A hydraulic braking pressure control system which includes a sleeve slidably received in a housing with opposite ends facing an output chamber connected to a brake device, and a pilot chamber connected to a control hydraulic pressure source. A control piston is slidably received in the sleeve, with one end of the control piston facing the output chamber and the other end facing a control chamber connected to the control hydraulic pressure source through a lock valve which is adapted to be closed in response to the movement of the sleeve, in a direction to increase the volume of the output chamber. A cut-off valve located between an input chamber leading to a master cylinder and the output chamber includes a valve member having a maximum amount of movement in a seating direction which is regulated to a position of the valve member spaced apart from a valve seat when a valve seat member follows movement of the sleeve in a direction to reduce the volume of the pilot chamber to the maximum amount. This ensures that the opening of the cut-off valve and tight closing of the control chamber upon an abnormal reduction of the control hydraulic pressure from the control hydraulic pressure reduction source can be achieved with a simplified system.

1 Claim, 1 Drawing Sheet

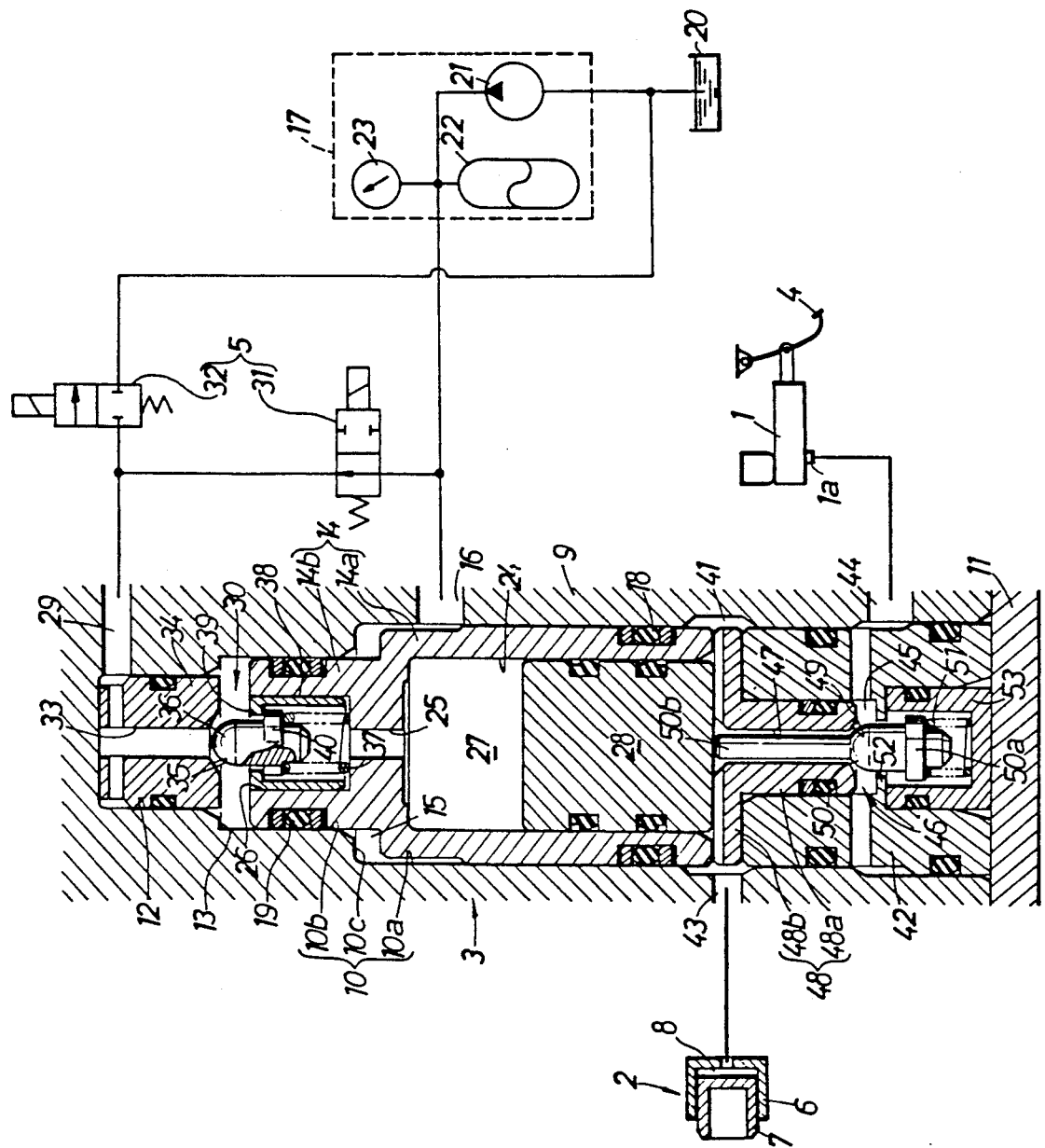

HYDRAULIC BRAKING PRESSURE CONTROL SYSTEM

BACKGROUND OF THE INVENTION

The present invention relates to a hydraulic braking pressure control system in which an output chamber and a control chamber are defined in a housing with opposite ends of a control piston facing them, respectively. The output chamber leads to a brake device, while the control chamber is connected to a control hydraulic pressure source and a reservoir through a switchover valve means capable of changing over the connection and disconnection. A cut-off valve is interposed between an input chamber defined in the housing and connected to a master cylinder and the output chamber, and is adapted to be closed in response to the movement of the control piston toward the control chamber.

Such hydraulic braking pressure control systems are conventionally known, for example, from Japanese Patent Application Laid-open No. 222,354/85.

In such a hydraulic braking pressure control system, it is necessary to design the system to operate even if the control hydraulic pressure from the control hydraulic pressure source is abnormally reduced by any reason. In the above prior art system, it is possible to open the cut-off valve when control hydraulic pressure is abnormally reduced, thereby applying the hydraulic braking pressure from the master cylinder to the brake device.

However, if the control piston is permitted to be moved in a direction to reduce the volume of the control chamber, i.e., in a direction to increase the volume of the output chamber after control hydraulic pressure in the pressure source is abnormally reduced, it is difficult to increase the hydraulic braking pressure applied to the brake device. Therefore, Japanese Patent Application Laid-open No. 107435/85 discloses a hydraulic braking pressure control system in which the control chamber is tightly closed when control hydraulic pressure is abnormally reduced. In this system, however, when control hydraulic pressure is abnormally reduced, the cut-off valve is permitted to be closed, and a passage connecting the input chamber and the output chamber to bypass the cut-off valve is opened. Therefore, such a passage and a means for opening and closing the passage are required in addition to the cut-off valve, resulting in a complicated construction.

OBJECTS AND SUMMARY OF THE INVENTION

The present invention has been accomplished with such circumstances in view, and it is an object of the present invention to provide a hydraulic braking pressure control system wherein the opening of the cut-off valve and the tight closing of the control chamber upon the abnormal reduction of control hydraulic pressure can be achieved with a simplified construction.

Accordingly the present invention includes a hydraulic braking pressure control system having an output chamber connected to a brake device and a control chamber connected to a control hydraulic pressure source and a reservoir through a switchover valve means capable of changing over the connection and disconnection with the chambers being defined in a housing by a control piston. A cut-off valve is interposed between an input chamber defined in the housing and connected to a master cylinder and the output chamber and is adapted to be closed in response to the movement of the control piston toward the control chamber. A sleeve is slidably received in the slide bore of the housing and has a larger diameter portion facing the output chamber to define a pilot chamber between the sleeve and a step in the slide bore. The pilot chamber is connected to the control hydraulic pressure source. The control piston is slidably received in the sleeve, with one end of the control piston facing the output chamber and the other end facing the control chamber. A lock valve is interposed between the control chamber and the switchover valve means and adapted to be closed in response to the movement of the sleeve in a direction to reduce the volume of the pilot chamber. The cut-off valve between the input chamber and the output chamber includes a valve seat member having a valve bore and axially movably disposed in the housing with one of opposite ends of the valve seat member abutting against an end face of the larger diameter portion of the sleeve and with the opposite ends of the valve seat member facing the input chamber and the output chamber, respectively, a valve member disposed at a location closer to the input chamber and able to seat on a valve seat which is provided on the valve seat member to surround that open end of the valve bore which is closer to the input chamber, the valve member being biased by a spring in a direction to seat on the valve seat, and a stopper fixedly disposed in the housing to regulate the maximum amount of movement of the valve member in a seating direction to a position of the valve member spaced apart from the valve seat when the valve seat member is moved to the maximum extent in response to the movement of the sleeve in a direction to reduce the volume of the pilot chamber.

With the above construction, when control hydraulic pressure from the control hydraulic pressure source is normal, the sleeve has been moved to the maximum extent toward the output chamber by the hydraulic pressure in the pilot chamber leading to the control hydraulic pressure source. In this condition, the cut-off valve is opened and closed by the control hydraulic pressure applied to the control chamber, so that the hydraulic braking pressure applied to the brake device can be controlled by controlling the operation of the switchover valve means in a condition in which the hydraulic braking pressure is delivered from the master cylinder. If control hydraulic pressure from the control hydraulic pressure source is abnormally reduced, then the sleeve and the control piston are moved in a direction to increase the volume of the output chamber in response to application of the hydraulic braking pressure from the master cylinder to the output chamber, and the valve seat member and the valve member are moved by the hydraulic pressure in the input chamber. Thus, the lock valve is closed and at the same time, in the cut-off valve, the valve seat member is moved in a manner to follow the sleeve even after the movement of the valve member is regulated by the stopper, thus opening the cut-off valve.

BRIEF DESCRIPTION OF THE DRAWINGS

The above and other objects and the attendant advantages of the present invention will become readily apparent by reference to the following detailed description when considered in conjunction with the accompanying drawing wherein:

The single FIGURE is a longitudinal sectional view illustrating one embodiment of the present invention.

DETAILED DESCRIPTION OF PREFERRED EMBODIMENT

The present invention will now be described by way of one embodiment with reference to the accompanying drawing. A hydraulic braking pressure control system 3 according to the present invention is interposed between a master cylinder 1 and a brake device 2. The hydraulic braking pressure control system 3 is capable of transmitting hydraulic braking pressure delivered through an output port 1a in the master cylinder 1 in response to the depressing of a brake pedal 4 during a normal braking and controlling the hydraulic braking pressure applied to the brake device in response to the controlling of the operation of a switchover valve means 5 during an anti-lock brake control.

The brake device 2 comprises a cylinder 6 and a braking piston 7 slidably received in the cylinder 6 and is adapted to exert a braking force by the hydraulic braking pressure applied to a hydraulic braking pressure chamber 8 defined between the cylinder 6 and the braking piston 7.

A housing 9 of the hydraulic braking pressure control system 3 is provided with a slide bore 10 which is comprised of, in sequence from one end (lower end as viewed in the FIGURE) side of the housing, a larger diameter bore portion 10a opened at one end into one end face of the housing 9, and a smaller diameter bore portion 10b coaxially connected at one end to the other end of the larger diameter bore portion 10a through a step 10c. One end of the slide bore 10, i.e., the opened end of the larger diameter bore portion 10a is closed by an end plate 11 secured to the housing 9. The housing 9 is provided with a bottomed engagement hole 12 which has a smaller diameter than that of the smaller diameter bore portion 10b and is coaxially connected to the end of the slide bore 10, i.e., the other end of the smaller diameter bore portion 10b through a step 13.

A sleeve 14 is slidably received in the slide bore 10 and comprised of a larger diameter portion 14a corresponding to the larger diameter bore portion 10a and a smaller diameter portion 14b corresponding to the smaller diameter bore portion 10b, the larger and smaller diameter portions 14a and 14b being coaxially connected to each other. A seal member 18 is fitted in an outer surface of the larger diameter portion 14a in slide contact with an inner surface of the larger diameter bore portion 10a. A seal member 19 is fitted in an outer surface of the smaller diameter portion 14b in slide contact with an inner surface of the smaller diameter bore portion 10b. An annular pilot chamber 15, facing the step 10c of the slide bore 10, is defined between an outer surface of the sleeve 14 and an inner surface of the slide bore 10. The pilot chamber 15 is connected to a control hydraulic pressure source 17 through a passage 16 provided in the housing 9.

The control hydraulic pressure source 17 comprises a hydraulic pump 21 for pumping a control liquid from a reservoir 20, an accumulator 22 connected to the hydraulic pump 21, and a pressure switch 23 for controlling the operation of the hydraulic pump 21. A control hydraulic given pressure higher than the hydraulic braking pressure delivered from the master cylinder 1 can be supplied from the control hydraulic pressure source 17.

Coaxially provided in the sleeve 14 are a cylinder bore 24 opening in an end face of the larger diameter portion 14a of the sleeve 14, a communication hole 25 having a diameter smaller than that of the cylinder bore 24, and a support hole 26 having a diameter larger than that of the communication hole 25 and opening in an end face of the smaller diameter portion 14b. A control piston 28 is slidably received in the cylinder bore 24 to define a control chamber 27 between the control piston 28 and the sleeve 14.

A lock valve 30 is interposed between the control chamber 27 and a passage 29 provided in the farthest end of the housing 9. The switchover valve means 5 is interposed between the passage 29 and the control hydraulic pressure source 17 as well as the reservoir 20.

The switchover valve means 5 is comprised of a normally-open type solenoid valve 31 interposed between the passage 29 and the control hydraulic pressure source 17, and a normally-closed type solenoid valve 32 interposed between the passage 29 and the reservoir 20, so that the change-over of the energization and deenergization of the solenoid valves 31 and 3 enables the change-over between a condition in which the passage 29 is in communication with the control hydraulic pressure source 17, a condition in which the passage 29 is in communication with the reservoir 20, and a condition in which the passage 29 is out of communication with the control hydraulic pressure source 17 and the reservoir 20.

The lock valve 30 comprises a valve seat member 34 fitted in the engagement hole 12 in the housing 9 and having a valve bore 33 communicating with the passage 29, a valve member 36 seatable on the valve seat 35 provided on the valve seat member 34 at the open end of the valve bore 33 closer to the sleeve 14, and a valve spring 37 for biasing the valve member 36 in a direction to seat on the valve seat 35. A basically cylindrical retainer 38 is press-fitted in the support hole 26 provided in the sleeve 14. A radially inwardly projecting flange 39 is provided on the end of the retainer 38 closer to the valve seat member 34. The valve member 36 is disposed to extend through the flange 39. Receiving collars 40 capable of abutting against the flange 39 are projectingly provided on a side of the valve member 36 at a plurality of circumferentially spaced apart locations. The valve spring 37 is mounted and compressed between the receiving collars 40 and the sleeve 14.

In the operation of such lock valve 30, in a condition in which normal control hydraulic pressure from the control hydraulic pressure source 17 has been applied to the pilot chamber 15 to move the sleeve 14 to the position shown, the valve member 36 with the receiving collars 40 in abutment against the flange 39 is in a position spaced apart from the valve seat 35. The valve member 36 would then seat on the valve seat 35 in response to the movement of the sleeve 14 toward the valve seat member 34 in accordance with the reduction of the control hydraulic pressure in the pilot chamber 15.

A basically cylindrical guide member 42 is received in the larger diameter bore portion 10a in the housing 9 at a location closer to the end plate 11 An output chamber 41 is defined between the guide member 42, the end face of the larger diameter portion 14a of the sleeve 14 and one end of the control piston 28. The output chamber 41 is connected to the brake device 2 through a passage 43 provided in the housing 9. An input chamber 45 is defined in the guide member 42 and connected to the output port 1a in the master cylinder 1 through a passage 44 provided in the housing 9. A cut-off valve 46 is interposed between the input chamber 45 and the output chamber 41.

The cut-off valve 46 comprises a valve seat member 48 having a valve bore 47 coaxial with the sleeve 14 and axially slidably received in the guide member 42, a valve member 50 seatable on a valve seat 49 provided on the valve seat member 48 to surround the open end of the valve bore 47 closer to the input chamber 45, a valve spring 51 for biasing the valve member 50 in a direction of seating on the valve seat 49, and a stopper 52 provided on the guide member 42 to regulate the maximum amount of movement of the valve member 50 in the direction to seat on the valve seat 49.

The stopper 52 is provided on an inner surface of the guide member 42 to project radially inwardly therefrom. A bottomed cylindrical lid member 53 is received in the guide member 42 and is clamped by the stopper 52 and the end plate 11. The valve seat member 48 is comprised of a cylindrical portion 48a received liquid-tightly and slidably in the guide member 42 from the side of the output chamber 41, and a disk portion 48b integrally provided on an end of the cylindrical portion 48a so that one end can abut against an end face of the guide member 42 in the output chamber 41 and the other end can abut against the end face of the larger diameter portion 14a of the sleeve 14 as well as one end face of the control piston 28. The length of the cylindrical portion 48a is set so that a space is provided between a leading end of the cylindrical portion 48a and the stopper 52 when the disk portion 48b is in abutment against the guide member 42. The input chamber 45 is defined between the leading end of the cylindrical portion 48a and the lid member 53 in the guide member 42.

The valve member 50 is provided with a regulating collar 50a abuttable against the stopper 52. A driving rod 50b is connected on the valve member 50 passing loosely through the valve bore 47 to be able to abuts against one end face of the control piston 28. The valve spring 51 is mounted in a compressed manner between the regulating collar 50a and the lid member 53. The valve spring 51 does not have a spring force enough to overcome the friction resistance of sliding movement of the control piston 28 in the cylinder bore 24.

In such cut-off valve 46, the stopper 52 for regulating the maximum amount of movement of the valve member 50 in the direction to seat on the valve seat 49 is disposed such that the valve member 50 with the regulating collar 50a in abutment against the stopper 52 is in a position spaced apart from the valve seat 49 when the valve seat member 48 has been moved to the maximum extent toward the sleeve 14 in response to the movement of the sleeve 14 in a direction to reduce the volume of the pilot chamber 15.

The operation of this embodiment will be described below. During normal braking in which the control hydraulic pressure source 17 is normally operative, the normally-open type solenoid valve 31 and the normally-closed type solenoid valve 32 of the switchover valve means 5 are deenergized. Therefore, control hydraulic pressure from the control hydraulic pressure source 17 is applied to the pilot chamber 15 and thus, the sleeve 14 moves to the maximum extent toward the output chamber 41. The lock valve 30 is in its opened state. Consequently, the control hydraulic pressure from the control hydraulic pressure source 17 is also applied to the control chamber 27 and thus, the control piston 28 moves to the maximum extent toward the output chamber 41. In this condition, the valve seat member 48 of the cut-off valve 46 has the disk portion 48b thereof clamped between the sleeve 14 as well as the control piston 28 and the guide member 42. The valve member 50 of the cut-off valve 46 is in an opened position spaced apart from the valve seat 49 as a result of the driving rod 50b being urged by the control piston 28.

Thereupon, if the brake pedal 4 is depressed for braking, the hydraulic braking pressure delivered from the output port 1a in the master cylinder 1 is passed through the passage 44, the input chamber 45, the cut-off valve 46, the output chamber 41 and the passage 43 and thus applied to the brake device 2.

When the braking force is to be reduced in response to the wheel being about to be locked during such braking, the normally-open type solenoid valve 31 and the normally-closed type solenoid valve 32 of the switchover valve means 5 are energized. This causes the control chamber 27 to be put into communication with the reservoir 20 and thus reduced in pressure. Therefore, the control piston 28 is moved by the hydraulic pressure from the output chamber 41 in a direction to increase the volume of the output chamber 41, thereby the reducing the braking force in the brake device 2. When the braking force is to be maintained, the normally-closed type solenoid valve 32 may be deenergized with the normally-open type solenoid valve 31 energized, thereby shutting off the communication of the control chamber 27 with the reservoir 20, so that the control piston 28 may be maintained at a given position. Further, when the braking force is to be increased again, both of the normally-open type solenoid valve 31 and the normally-closed type solenoid valve 32 may be deenergized. This enables the braking force of the brake device 2 to be increased by application of the control hydraulic pressure from the control hydraulic pressure source 17 to the control chamber 27.

However, if that operation of the control hydraulic pressure source 17 fails and control hydraulic pressure is abnormally reduced, prior to the braking operation, the cut-off valve 46 is in its opened state. If the hydraulic braking pressure from the master cylinder 1 is applied to the input chamber 45 in response to the braking operation, such hydraulic braking pressure is applied to the output chamber 41 through the valve bore 47, thereby urging the control piston 28 and the sleeve 14 in the direction to increase the volume of the output chamber 41. The valve member 50 of the cut-off valve 46, moves to follow the movement of the control piston 28, thus seating on the valve seat 49, thereby closing the cut-off valve 46. In response to the closing of the cut-off valve 46, the hydraulic pressure from the input chamber 45 is applied directly to the valve member 50 and the valve seat member 48, so that the valve member 50 and the valve seat member 48 are urged toward the output chamber 41 while urging the sleeve 14 and the control piston 28 in a condition in which the hydraulic pressure in the pilot chamber 15 and the control chamber 27 is reduced. However, the maximum amount of movement of the valve member 50 toward the output chamber 41 is regulated by the stopper 52, whereas an acceptable amount of movement of the valve seat member 48 toward the output chamber 41 is larger than the amount of movement of the valve member 50 regulated by the stopper 52. Therefore, the valve seat 49 moves away from the valve member 50, resulting in the cut-off valve 46 being opened. Accordingly, the hydraulic braking pressure from the master cylinder 1 can be applied to the brake device 2 to insure the braking force.

Moreover, as a result of the sleeve 14 being urged by the valve seat member 48 in the direction to reduce the volume of the pilot chamber 15, the lock valve 30 is closed prior to opening of the cut-off valve 46, thereby avoiding any problem that the hydraulic pressure from the control chamber 27 is released more than necessary. This ensures that the volume of the output chamber 41 cannot be increased more than necessary, and the braking force can be easily insured in the brake device 2.

If control hydraulic pressure is abnormally reduced in the course of the braking operation, then the sleeve 14 and the control piston 28 are urged by the hydraulic pressure in the output chamber 41. This causes the lock valve 30 to be closed and at the same time, in the cut-off valve 46, the valve member 50 biased by the spring 51 is caused to seat on the valve seat 49 to urge the valve seat member 48. However, the amount of movement of the valve member 50 is regulated by the stopper 52, whereas the valve seat member 48 can likewise move in an amount larger than the amount of movement of the valve member 50. Therefore, the cut-off valve 46 is opened, which makes it possible to subsequently insure the braking force to the brake device 2.

In this manner, it is possible to close the lock valve 30 and open the cut-off valve 46 by movement of the sleeve 14 when the control hydraulic pressure is abnormally reduced, thereby easily insuring the braking force in the brake device 2.

As discussed above, according to the present invention, when the control hydraulic pressure is abnormally reduced, the lock valve is closed to bring the control chamber into a tightly closed state and the same time, the cut-off valve is opened by the movement of the sleeve in the direction to reduce the volume of the pilot chamber in response to application of the hydraulic braking pressure from the master cylinder to the output chamber. This enables the braking force to be insured in the brake device.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claim in determining the full scope of the invention.

What is claimed is:

1. A hydraulic braking pressure control system comprising: a housing, a control piston in said housing defining an output chamber and a control chamber, opposite ends of said control piston facing said output chamber and said control chamber, respectively, said output chamber being connected to a brake device, said control chamber being connected to a control hydraulic pressure source and a reservoir through a switchover valve means capable of changing over connection and disconnection, and a cut-off valve interposed between an input chamber defined in said housing and connected to a master cylinder and said output chamber, said cut-off valve being adapted to be closed in response to a movement of said control piston toward said control chamber, wherein said hydraulic braking pressure control system further comprises:

said housing having a slide bore comprising a larger diameter bore portion, a step at one end of said larger diameter bore portion, and a smaller diameter bore portion coaxially connected to said larger diameter portion through said step;

a sleeve having a larger diameter portion in slide contact with said larger diameter bore portion and a smaller diameter portion in slide contact with said smaller diameter bore portion, said sleeve being slidably received in said slide bore with an end face of said larger diameter portion facing said output chamber and defining a pilot chamber between said sleeve and said step which is connected to said control hydraulic pressure source;

said control piston being slidably received in said sleeve with one end of said control piston facing said output chamber and the other end facing said control chamber defined between said sleeve and said piston;

a lock valve interposed between said control chamber and said switchover valve means and adapted to be closed in response to a movement of said sleeve in a direction to reduce a volume of said pilot chamber; and said cut-off valve between said input chamber and said output chamber comprising a valve seat member having a valve bore and being axially movably disposed in said housing with one of opposite, ends of said valve seat member abutting against said end face of said larger diameter portion of said sleeve and with the opposite ends of said valve seat member facing said input chamber and said output chamber, respectively, a valve seat provided on said valve seat member surrounding an open end of said valve bore which is closer to said input chamber, a valve member disposed at a location closer to said input chamber and able to seat on said valve seat, a spring biasing said valve member in a direction to seat on said valve seat, and a stopper fixedly disposed in said housing to regulate the maximum amount of movement of said valve member in a seating direction to a position of said valve member spaced apart from said valve seat when said valve seat member is moved to said maximum amount in response to a movement of said sleeve in a direction to reduce said volume of said pilot chamber.

* * * * *